United States Patent
Oka et al.

(10) Patent No.: US 10,495,331 B2
(45) Date of Patent: *Dec. 3, 2019

(54) AIR CONDITIONER

(71) Applicant: FUJITSU GENERAL LIMITED, Kanagawa (JP)

(72) Inventors: Yasuhiro Oka, Kanagawa (JP); Takahiro Matsunaga, Kanagawa (JP); Takashi Kimura, Kanagawa (JP); Shigeaki Suyama, Kanagawa (JP); Kotaro Toya, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 84 days.

This patent is subject to a terminal disclaimer.

(21) Appl. No.: 15/637,340

(22) Filed: Jun. 29, 2017

(65) Prior Publication Data
US 2018/0010816 A1    Jan. 11, 2018

(30) Foreign Application Priority Data
Jul. 7, 2016  (JP) ................. 2016-134844

(51) Int. Cl.
*F24F 5/00* (2006.01)
*G05D 23/19* (2006.01)
(Continued)

(52) U.S. Cl.
CPC .............. *F24F 5/001* (2013.01); *F25B 13/00* (2013.01); *F25B 49/02* (2013.01);
(Continued)

(58) Field of Classification Search
CPC ... F24D 11/02; F24F 5/00; F24F 5/001; F25B 13/00; F25B 2313/0233;
(Continued)

(56) References Cited

U.S. PATENT DOCUMENTS

| 4,771,610 | A | 9/1988 | Matsuoka |
| 5,263,333 | A | 11/1993 | Kubo |

(Continued)

FOREIGN PATENT DOCUMENTS

| JP | 2011007482 A2 | 1/2011 |
| JP | 4947221 B2 | 6/2012 |

(Continued)

OTHER PUBLICATIONS

European Search Report dated Nov. 23, 2017 for the corresponding European Patent Application No. 17171595.6.

*Primary Examiner* — Edward F Landrum
*Assistant Examiner* — Chang H. Park
(74) *Attorney, Agent, or Firm* — Rankin, Hill & Clark LLP (57) ABSTRACT

An air conditioner includes: an outdoor unit; a plurality of indoor units respectively including indoor heat exchangers; expansion valves respectively provided to the plurality of indoor units, the expansion valves being configured to adjust flow rates of a refrigerant in the indoor heat exchangers; and a controller for executing a refrigerant amount balance control for adjusting opening degrees of the expansion valves so that operation state amounts, with which the indoor heat exchangers exert heat exchange amounts, of the plurality of indoor units become equal to each other.

10 Claims, 4 Drawing Sheets

(51) Int. Cl.
*G05D 23/24* (2006.01)
*F25B 13/00* (2006.01)
*F25B 49/02* (2006.01)
*F25D 17/00* (2006.01)
*G05D 23/00* (2006.01)

(52) U.S. Cl.
CPC ......... *G05D 23/1912* (2013.01); *G05D 23/24* (2013.01); *F24F 5/00* (2013.01); *F25B 2313/0233* (2013.01); *F25B 2500/19* (2013.01); *F25B 2600/23* (2013.01); *F25B 2600/2513* (2013.01); *F25D 17/00* (2013.01); *G05D 23/00* (2013.01)

(58) Field of Classification Search
CPC .. F25B 2313/02331; F25B 2313/02334; F25B 2500/19; F25B 2600/23; F25B 2600/2513; F25B 2700/21163; F25B 2700/21175; F25B 29/00; F25B 30/02; F25B 41/04; F25B 49/02; F25B 5/02; F25B 6/00; F25B 6/02; F25D 17/00; F25N 1/10; G05B 13/02; G05D 23/00; G05D 23/1912; G05D 23/24
See application file for complete search history.

(56) References Cited

U.S. PATENT DOCUMENTS

| | | | |
|---|---|---|---|
| 2011/0023534 A1* | 2/2011 | Kasahara | F25B 13/00 62/498 |
| 2012/0297808 A1 | 11/2012 | Honda | |
| 2013/0067944 A1* | 3/2013 | Kibo | F25B 49/02 62/157 |
| 2017/0198943 A1* | 7/2017 | Oka | F25B 49/02 |
| 2018/0095483 A1* | 4/2018 | Tokudi | F25B 1/00 |

FOREIGN PATENT DOCUMENTS

| | | | | |
|---|---|---|---|---|
| JP | 5400177 B1 | 1/2014 | | |
| JP | 2016196971 A | * 11/2016 | | F25B 1/00 |

\* cited by examiner

AIR CONDITIONER

CROSS-REFERENCE TO RELATED APPLICATION

This application claims priority from Japanese Patent Application No. 2016-134844 filed with the Japan Patent Office on Jul. 7, 2016, the entire content of which is hereby incorporated by reference.

BACKGROUND

1. Technical Field

Embodiments of the present disclosure relate to an air conditioner.

2. Description of the Related Art

Typically, in an air conditioner including an outdoor unit and an indoor unit that are connected to each other via a liquid pipe and a gas pipe, an opening degree of an expansion valve is controlled so that a refrigerant subcooling degree or a refrigerant superheating degree in a refrigerant exit opening of an indoor heat exchanger of the indoor unit reaches a predetermined target value. For example, an air conditioner described in JP-A-2011-007482 includes an outdoor unit and an indoor unit. The outdoor unit includes a compressor, a four-way valve, and an outdoor heat exchanger. The indoor unit includes an indoor heat exchanger and an indoor expansion valve. For example, during a heating operation, connection of the four-way valve is changed so that a refrigerant is recirculated through the compressor, the indoor heat exchanger, the indoor expansion valve, and the outdoor heat exchanger, in this order. Consequently, the outdoor heat exchanger serves as an evaporator, and the indoor heat exchanger serves as a condenser. Then, the opening degree of the indoor expansion valve is controlled so that the refrigerant subcooling degree in the refrigerant exit opening of the indoor heat exchanger reaches a target value, thereby allowing the indoor unit to exert a necessary heating capacity.

Incidentally, in the air conditioner described in JP-A-2011-007482, one outdoor unit is connected to one indoor unit via a refrigerant pipe. Also in an air conditioner in which one outdoor unit is connected to a plurality of indoor units via a refrigerant pipe, opening degrees of indoor expansion valves of the respective indoor units are controlled so that refrigerant subcooling degrees or refrigerant superheating degrees of the indoor units reach a target value.

SUMMARY

An air conditioner includes: an outdoor unit; a plurality of indoor units respectively including indoor heat exchangers; expansion valves respectively provided to the plurality of indoor units, the expansion valves being configured to adjust flow rates of a refrigerant in the indoor heat exchangers; and a controller for executing a refrigerant amount balance control for adjusting opening degrees of the expansion valves so that operation state amounts, with which the indoor heat exchangers exert heat exchange amounts, of the plurality of indoor units become equal to each other.

DESCRIPTION OF THE EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the air conditioner in which the one outdoor unit is connected to the plurality of indoor units via the refrigerant pipe, during an air-conditioning operation, there might exist an indoor unit through which a refrigerant is difficult to flow, as compared to the other indoor units. For example, among the plurality of indoor units, there is an indoor unit that is installed in a position further from the outdoor unit than the other indoor units are. A portion of a refrigerant pipe via which such an indoor unit and the outdoor unit are connected to each other is longer than those of the other indoor units. Therefore, a pressure loss that is caused by the refrigerant pipe and affects the indoor unit is greater than those of the other indoor units. Consequently, the refrigerant is difficult to flow through the indoor unit that is installed in the position further from the outdoor unit than the other indoor units are. Furthermore, among the plurality of indoor units, there might exist an indoor unit including an indoor heat exchanger larger than those of the other indoor units. In such an indoor unit, the indoor heat exchanger might have a path longer than those in the other indoor units. Moreover, among the plurality of indoor units, there might exist an indoor unit including an indoor heat exchanger having a different shape from those of the other indoor units. In such an indoor unit, the indoor heat exchanger might have a path whose number of turnings is larger than those in the other indoor units. In the indoor unit including the indoor heat exchanger having a path longer than those in the other indoor units or a path whose number of turnings is larger than those in the other indoor units, a pressure loss caused by the path is greater than those in the other indoor units, and thus a refrigerant is difficult to flow through the path.

In the above case where there exists, among the plurality of indoor units, an indoor unit through which a refrigerant is difficult to flow since an installment conditions and/or an indoor heat exchanger of the indoor unit is different from those of the other indoor units, a rise time of the indoor unit is longer than those of the other indoor units, the rise time being a period taken until an indoor temperature reaches a set temperature since an air-conditioning operation is started. Namely, the indoor units have respective different rise times, each of which is a period taken until the indoor temperature reaches the set temperature. Especially, the indoor unit having a long rise time, which is the period taken until the indoor temperature reaches the set temperature, may give a feeling of discomfort to a user in a room in which this indoor unit is installed.

An object of the present disclosure is to provide an air conditioner that is capable of reducing a difference between rise times of a plurality of indoor units if the difference exists, each of the rise times being a period taken until an indoor temperature reaches a set temperature.

An air conditioner according to an aspect of the present disclosure (the present air conditioner) includes: an outdoor unit; a plurality of indoor units respectively including indoor heat exchangers; expansion valves respectively provided to the plurality of indoor units, the expansion valves being configured to adjust flow rates of a refrigerant in the indoor heat exchangers; and a controller for executing a refrigerant amount balance control for adjusting opening degrees of the expansion valves so that operation state amounts, with which the indoor heat exchangers exert heat exchange amounts, of the plurality of indoor units become equal to each other.

In the present air conditioner, the operation state amounts may be refrigerant superheating degrees in refrigerant exit openings of the indoor heat exchangers during a cooling operation.

In this case, the controller may calculate an average value of the refrigerant superheating degrees from a maximum value and a minimum value of the refrigerant superheating degrees of the plurality of indoor units, and adjusts the opening degrees of the expansion valves so that the refrigerant superheating degrees of the plurality of indoor units reach the average value.

In the present air conditioner, the operation state amounts may be refrigerant subcooling degrees in refrigerant exit openings of the indoor heat exchangers during a heating operation.

In this case, the controller may calculate an average value of the refrigerant subcooling degrees from a maximum value and a minimum value of the refrigerant subcooling degrees of the plurality of indoor units, and adjusts the opening degrees of the expansion valves so that the refrigerant subcooling degrees of the plurality of indoor units reach the average value.

In the present air conditioner, the expansion valves may be disposed inside the indoor units.

In the present air conditioner, the controller may execute the refrigerant amount balance control in a case where the plurality of indoor units has respective different rise times, each of which is a period taken until an indoor temperature reaches a set temperature since an air-conditioning operation is started.

According to the present air conditioner, for example, it is possible to reduce a difference between rise times of the indoor units if the difference exists, each of the rise times being a period taken until an indoor temperature reaches a set temperature.

With reference to the drawings, the following provides a detailed description of embodiments of the present disclosure. In an air conditioner according to an embodiment of the present disclosure, one outdoor unit installed outside a building is connected in parallel to three indoor units installed inside the building. By using all of the indoor units at once, a cooling operation or a heating operation can be performed. Note that aspects of the present disclosure are not limited to the below-described embodiments. The aspects of the present disclosure may be altered in various ways within a gist of the present disclosure.

Figure 1A:
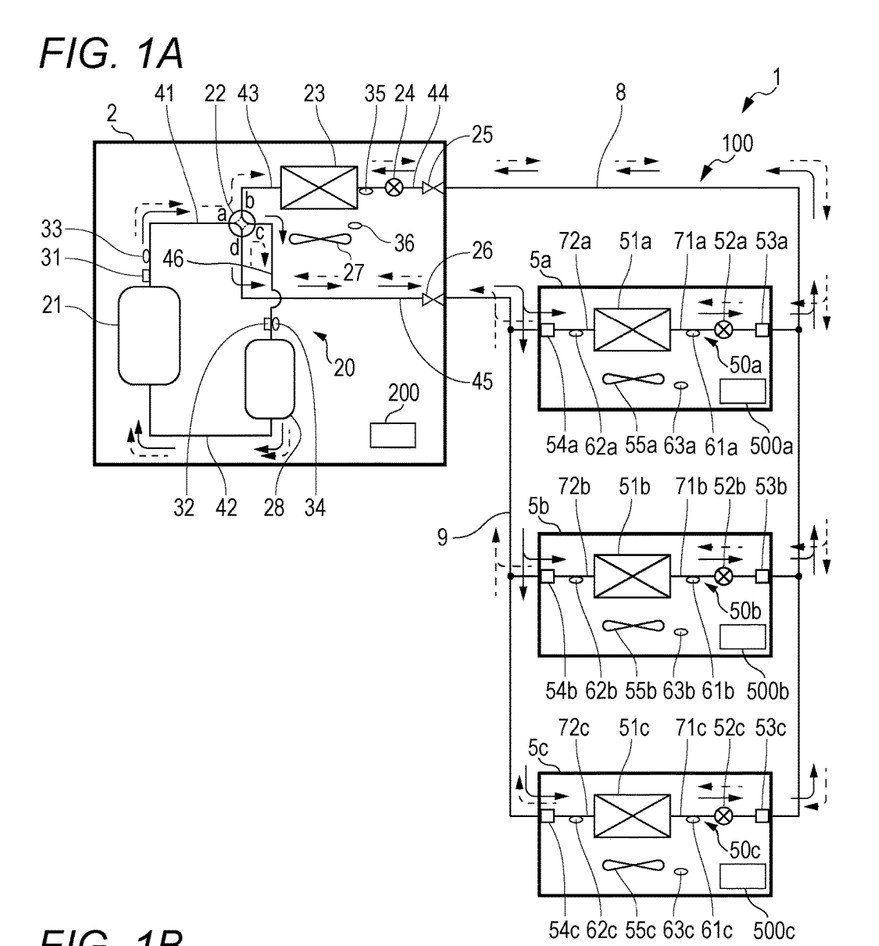
FIG. 1A is a refrigerant circuit diagram of an air conditioner according to an embodiment of the present disclosure.
Figure 2:
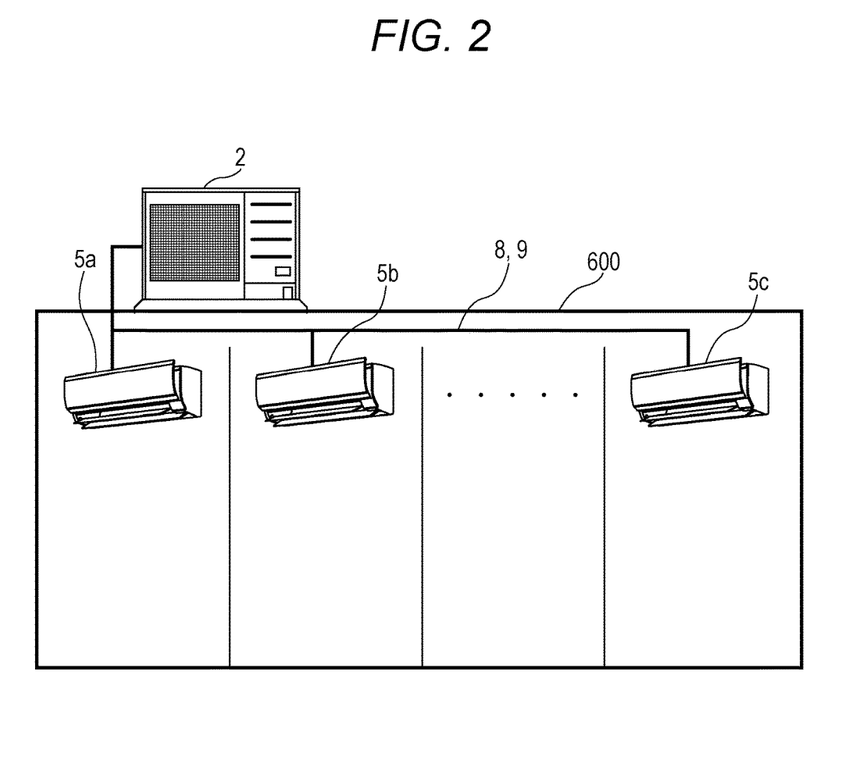
FIG. 2 shows an installation layout of indoor units and an outdoor unit according to the embodiment of the present disclosure.

[Embodiments]
<Configuration of Air Conditioner>
As shown in FIGS. 1A and 2, an air conditioner 1 of to the present embodiment includes one outdoor unit 2 and three indoor units 5a to 5c. The outdoor unit 2 is installed outside a building 600, which is a single-story building. The indoor units 5a to 5c are installed indoors, and are connected in parallel to the outdoor unit 2 via a pipe including a liquid pipe 8 and a gas pipe 9. Specifically, one end of the liquid pipe 8 is connected to a closing valve 25 of the outdoor unit 2. The other end of the liquid pipe 8 is branched so as to be connected to liquid-pipe connection parts 53a to 53c of the indoor units 5a to 5c. Meanwhile, one end of the gas pipe 9 is connected to a closing valve 26 of the outdoor unit 2. The other end of the gas pipe 9 is branched so as to be connected respectively to gas-pipe connection parts 54a to 54c of the indoor units 5a to 5c. A refrigerant circuit 100 of the air conditioner 1 is configured as above.

<Configuration of Outdoor Unit>
First, the outdoor unit 2 will be described. The outdoor unit 2 includes a compressor 21, a four-way valve 22, an outdoor heat exchanger 23, an outdoor expansion valve 24, the closing valve 25 to which the one end of the liquid pipe 8 is connected, the closing valve 26 to which the one end of the gas pipe 9 is connected, an accumulator 28, and an outdoor fan 27. These members except for the outdoor fan 27 are connected to each other via a refrigerant pipe (described in detail later), so that an outdoor-unit refrigerant circuit 20, which is a part of the refrigerant circuit 100, is constituted.

The compressor 21 is a capacity-variable type compressor. Namely, the compressor 21 is driven by a motor (not illustrated) whose number of rotations is controlled by an inverter. Thus, an operation capacity of the compressor 21 can be changed. A refrigerant discharge side of the compressor 21 is connected to a port a of the four-way valve 22 (described later) via a discharge pipe 41. Meanwhile, a refrigerant intake side of the compressor 21 is connected to a refrigerant outflow side of the accumulator 28 via an intake pipe 42.

The four-way valve 22 is a valve for changing a flow direction of the refrigerant. The four-way valve 22 has four ports a, b, c, and d. As described above, the port a is connected to the refrigerant discharge side of the compressor 21 via the discharge pipe 41. The port b is connected to one refrigerant entry/exit opening of the outdoor heat exchanger 23 via a refrigerant pipe 43. The port c is connected to a refrigerant inflow side of the accumulator 28 via a refrigerant pipe 46. The port d is connected to the closing valve 26 via an outdoor-unit gas pipe 45.

The outdoor heat exchanger 23 performs heat exchange between the refrigerant and ambient air that has been taken into the outdoor unit 2 by rotation of the outdoor fan 27 (describer later). As described above, the one refrigerant entry/exit opening of the outdoor heat exchanger 23 is connected to the port b of the four-way valve 22 via the refrigerant pipe 43. The other refrigerant entry/exit opening of the outdoor heat exchanger 23 is connected to the closing valve 25 via an outdoor-unit liquid pipe 44.

The outdoor expansion valve 24 is provided in the outdoor-unit liquid pipe 44. The outdoor expansion valve 24 is an electronic expansion valve. Adjusting an opening degree of the outdoor expansion valve 24 adjusts an amount of refrigerant flown into the outdoor heat exchanger 23 or an amount of refrigerant flown from the outdoor heat exchanger 23. While the air conditioner 1 performs a cooling operation, the opening degree of the outdoor expansion valve 24 is in a fully opened state. Meanwhile, while the air conditioner 1 performs a heating operation, the opening degree of the outdoor expansion valve 24 is controlled according to a discharge temperature of the compressor 21 detected by a discharge temperature sensor 33 (described later) so that that the discharge temperature does not exceed a capacity upper limit value.

The outdoor fan 27 is made of a resin material, and is positioned near the outdoor heat exchanger 23. The outdoor fan 27 is rotated by a fan motor (not illustrated). Consequently, ambient air is taken into the outdoor unit 2 through an inlet (not illustrated). Furthermore, the ambient air having been subjected to the heat exchange with the refrigerant in the outdoor heat exchanger 23 is discharged to the outside of the outdoor unit 2 through an outlet (not illustrated).

As described above, the refrigerant inflow side of the accumulator 28 is connected to the port c of the four-way valve 22 via the refrigerant pipe 46. The refrigerant outflow side of the accumulator 28 is connected to the refrigerant intake side of the compressor 21 via the intake pipe 42. The accumulator 28 separates, into a gas refrigerant and a liquid refrigerant, the refrigerant flown into the accumulator 28 from the refrigerant pipe 46, and sends the gas refrigerant to the compressor 21.

In addition to the above-described members, the outdoor unit 2 includes various sensors. As shown in FIG. 1A, the discharge pipe 41 includes a discharge pressure sensor 31 and the discharge temperature sensor 33. The discharge pressure sensor 31 detects a discharge pressure, which is a pressure of the refrigerant discharged from the compressor 21. The discharge temperature sensor 33 detects a temperature of the refrigerant discharged from the compressor 21. In the refrigerant pipe 46 and near a refrigerant inflow opening of the accumulator 28, an intake pressure sensor 32 and an intake temperature sensor 34 are provided. The intake pressure sensor 32 detects a pressure of the refrigerant that is to be taken into the compressor 21. The intake temperature sensor 34 detects a temperature of the refrigerant that is to be taken into the compressor 21.

In the outdoor-unit liquid pipe 44 and between the outdoor heat exchanger 23 and the outdoor expansion valve 24, a heat exchange temperature sensor 35 is provided. The heat exchange temperature sensor 35 detects a temperature of the refrigerant that is to be flown into the outdoor heat exchanger 23 or a temperature of the refrigerant that is flown from the outdoor heat exchanger 23. Furthermore, near the inlet (not illustrated) of the outdoor unit 2, an ambient air temperature sensor 36 is provided. The ambient air temperature sensor 36 detects a temperature of ambient air flown into the outdoor unit 2, i.e., an ambient air temperature.

Figure 1B:
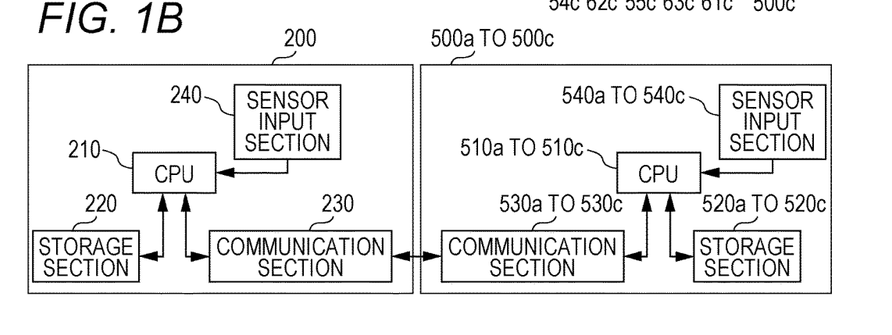
FIG. 1B is a block diagram of an outdoor-unit controller and an indoor-unit controller of the air conditioner.

Furthermore, the outdoor unit 2 includes an outdoor-unit controller 200. The outdoor-unit controller 200 is mounted on a control board accommodated in an electrical equipment box (not illustrated) of the outdoor unit 2. As shown in FIG. 1B, the outdoor-unit controller 200 includes a CPU 210, a storage section 220, a communication section 230, and a sensor input section 240.

The storage section 220 includes a ROM and a RAM. The storage section 220 stores a control program for the outdoor unit 2, detection values corresponding to detection signals from the various sensors, control states of the compressor 21 and the outdoor fan 27, and the like. The communication section 230 is an interface for performing communication with the indoor units 5a to 5c. The sensor input section 240 obtains detection results of the various sensors in the outdoor unit 2, and outputs the detection results to the CPU 210.

The CPU 210 obtains the above-described detection results of the various sensors in the outdoor unit 2 via the sensor input section 240. Furthermore, the CPU 210 obtains control signals from the indoor units 5a to 5c via the communication section 230. Based on the detection results and the control signals thus obtained, the CPU 210 controls driving of the compressor 21 and the outdoor fan 27. Furthermore, based on the detection results and the control signals thus obtained, the CPU 210 controls shifting of the four-way valve 22. Moreover, based on the detection results and the control signals thus obtained, the CPU 210 adjusts the opening degree of the outdoor expansion valve 24.

<Configuration of Indoor Unit>

Next, the three indoor units 5a to 5c will be described. The three indoor units 5a to 5c respectively include indoor heat exchangers 51a to 51c, indoor expansion valves 52a to 52c, the liquid-pipe connection parts 53a to 53c to which the branches of the other end of the liquid pipe 8 are connected, the gas-pipe connection parts 54a to 54c to which the branches of the other end of the gas pipe 9 are connected, and indoor fans 55a to 55c. The indoor heat exchangers 51a to 51c, the indoor expansion valves 52a to 52c, the liquid-pipe connection parts 53a to 53c, and the gas-pipe connection parts 54a to 54c are connected to each other respectively via refrigerant pipes (described in detail later), so that indoor-unit refrigerant circuits 50a to 50c, each of which is a part of the refrigerant circuit 100, are constituted. Note that the three indoor units 5a to 5c have identical capacities. If refrigerant superheating degrees in refrigerant exit openings of the indoor heat exchangers 51a to 51c during a cooling operation are set at a predetermined value (for example, five degrees) or less, each of the indoor units 5a to 5c can exert an adequate cooling capacity. Meanwhile, if refrigerant subcooling degrees in refrigerant exit openings of the indoor heat exchangers 51a to 51c during a heating operation are set at a predetermined value (for example, 10 degrees) or less, each of the indoor units 5a to 5c can exert an adequate heating capacity. Note that each of the above-described refrigerant superheating degree and refrigerant subcooling degree corresponds to an operation state amount of the present disclosure.

Note that the indoor units 5a to 5c have identical configurations. Therefore, the following description will deal with a configuration of the indoor unit 5a, and descriptions about the other indoor units 5b and 5c are omitted. In FIGS. 1A and 1B, members of the indoor unit 5b corresponding to members of the indoor unit 5a are given reference signs of the corresponding members of the indoor unit 5a whose final letters "a" have been replaced with "b". Similarly, members of the indoor unit 5c corresponding to members of the indoor unit 5a are given reference signs of the corresponding members of the indoor unit 5a whose final letters "a" have been replaced with "c".

The indoor heat exchanger 51a performs heat exchange between the refrigerant and indoor air that has been taken into the indoor unit 5a through an inlet (not illustrated) by rotation of an indoor fan 55a (described later). One refrigerant entry/exit opening of the indoor heat exchanger 51a is connected to the liquid-pipe connection part 53a via an indoor-unit liquid pipe 71a. The other refrigerant entry/exit opening of the indoor heat exchanger 51a is connected to the gas-pipe connection part 54a via an indoor-unit gas pipe 72a. While the indoor unit 5a performs a cooling operation, the indoor heat exchanger 51a serves as an evaporator. While the indoor unit 5a performs a heating operation, the indoor heat exchanger 51a serves as a condenser.

Note that the liquid-pipe connection part 53a and the gas-pipe connection part 54a are connected to the refrigerant pipe by welding, a flare nut, and/or the like.

The indoor expansion valve 52a is provided in the indoor-unit liquid pipe 71a. The indoor expansion valve 52a is an electronic expansion valve. The indoor expansion valve 52a adjusts a flow rate of the refrigerant of the indoor heat exchanger 51a. In a case where the indoor heat exchanger 51a serves as an evaporator (i.e., in a case where the indoor unit 5a performs a cooling operation), the opening degree of the indoor expansion valve 52a is adjusted so that the refrigerant superheating degree in the refrigerant exit opening (the gas-pipe connection part 54a) of the indoor heat exchanger 51a reaches an average refrigerant superheating degree (described later). Meanwhile, in a case where the indoor heat exchanger 51a serves as a condenser (i.e., in a case where the indoor unit 5a performs a heating operation), the opening degree of the indoor expansion valve 52a is adjusted so that the refrigerant subcooling degree in the refrigerant exit opening (the liquid-pipe connection part 53a) of the indoor heat exchanger 51a reaches an average refrigerant subcooling degree (described later).

The indoor fan 55a is made of a resin material, and is positioned near the indoor heat exchanger 51a. The indoor fan 55a is rotated by a fan motor (not illustrated). Consequently, indoor air is taken into the indoor unit 5a through the inlet (not illustrated). Furthermore, the indoor air having been subjected to the heat exchange with the refrigerant in the indoor heat exchanger 51a is supplied into the room through an outlet (not illustrated).

In addition to the above-described members, the indoor unit 5a includes various sensors. In the indoor-unit liquid pipe 71a and between the indoor heat exchanger 51a and the indoor expansion valve 52a, a liquid-side temperature sensor 61a is provided. The liquid-side temperature sensor 61a detects a temperature of the refrigerant that is to be flown into the indoor heat exchanger 51a or the refrigerant flown from the indoor heat exchanger 51a. In the indoor-unit gas pipe 72a, a gas-side temperature sensor 62a is provided. The gas-side temperature sensor 62a detects a temperature of the refrigerant flown from the indoor heat exchanger 51a or the refrigerant that is to be flown into the indoor heat exchanger 51a. Near the inlet (not illustrated) of the indoor unit 5a, an intake temperature sensor 63a is provided. The intake temperature sensor 63a detects a temperature (i.e., an intake temperature) of the indoor air flown into the indoor unit 5a.

Furthermore, the indoor unit 5a includes an indoor-unit controller 500a. The indoor-unit controller 500a is mounted on a control board accommodated in an electrical equipment box (not illustrated) of the indoor unit 5a. As shown in FIG. 1B, the indoor-unit controller 500a includes a CPU 510a, a storage section 520a, a communication section 530a, and a sensor input section 540a.

The storage section 520a includes a ROM and a RAM. The storage section 520a stores a control program for the indoor unit 5a, detection values corresponding to detection signals from the various sensors, setting information regarding an air-conditioning operation inputted by a user, and the like. The communication section 530a is an interface for performing communication with the outdoor unit 2 and the other indoor units 5b and 5c. The sensor input section 540a obtains detection results of the various sensors in the indoor unit 5a, and outputs the detection results to the CPU 510a.

The CPU 510a obtains the above-described detection results of the various sensors in the indoor unit 5a via the sensor input section 540a. Furthermore, the CPU 510a obtains, via a remote controller light receiving section (not illustrated), a signal that is set as a result of a user's operation on a remote controller (not illustrated) and includes information such as operation information and a timer operation setting. Moreover, the CPU 510a transmits an operation start/stop signal and a control signal including the operation information (e.g., an operation mode such as a cooling mode or a heating mode, a set temperature, and an indoor temperature) to the outdoor unit 2 via the communication section 530a. Furthermore, the CPU 510a receives, from the outdoor unit 2 via the communication section 530a, a control signal including information such as a discharge pressure detected by the outdoor unit 2. Based on the detection results thus obtained and the signals from the remote controller and the outdoor unit 2, the CPU 510a adjusts the opening degree of the indoor expansion valve 52a, and controls driving of the indoor fan 55a.

Note that the above-described outdoor-unit controller 200 (CPU 210) and indoor-unit controllers 500a to 500c (CPUs 510a to 510c) constitute a controller of the present disclosure.

<Installation of Outdoor Unit and Indoor Units>

The above-described air conditioner 1 is installed for the building 600 shown in FIG. 2. Specifically, the outdoor unit 2 is placed outdoors, and the indoor units 5a to 5c are installed in respective rooms inside the building. The outdoor unit 2 and the indoor units 5a to 5c are connected to each other via the above-described liquid pipe 8 and gas pipe 9. Parts of the liquid pipe 8 and the gas pipe 9 are buried in a wall (not illustrated) and a ceiling (not illustrated) of the building 600. Note that, as shown in FIG. 2, the indoor unit 5c is installed in a position further from the outdoor unit 2 than the indoor units 5a and 5b are. For example, a distance between the outdoor unit 2 and the indoor unit 5a is 1.5 m, a distance between the outdoor unit 2 and the indoor unit 5b is 2.5 m, and a distance between the outdoor unit 2 and the indoor unit 5c is 10 m. Namely, regarding the indoor unit 5c, a length of portions of the liquid pipe 8 and the gas pipe 9 by which the indoor unit 5c and the outdoor unit 2 are connected to each other is longer than those of the indoor units 5a and 5b.

<Flow of Refrigerant in Refrigerant Circuit and Operation of Each Section>

Next, with reference to FIG. 1A, the following describes a flow of a refrigerant in the refrigerant circuit 100 and an operation of each section while the air conditioner 1 of the present embodiment performs an air-conditioning operation. The following description first deals with a case where the indoor units 5a to 5c perform a cooling operation and then with a case where the indoor units 5a to 5c perform a heating operation. In FIG. 1A, the dashed arrows indicate a flow of the refrigerant during the cooling operation, whereas the solid arrows indicate a flow of the refrigerant during the heating operation.

<Cooling Operation>

As shown in FIG. 1A, in the case where the indoor units 5a to 5c perform a cooling operation, the CPU 210 of the outdoor-unit controller 200 shifts the four-way valve 22 such that the ports a and b of the four-way valve 22 are communicated with each other and the ports c and d of the four-way valve 22 are communicated with each other, as indicated by the dashed lines. Consequently, the refrigerant circuit 100 enters a cooling cycle. Namely, the outdoor heat exchanger 23 serves as a condenser, and the indoor heat exchangers 51a to 51c each serve as an evaporator.

The high-pressure refrigerant discharged from the compressor 21 flows through the discharge pipe 41, and then flows into the four-way valve 22. Furthermore, from the four-way valve 22, the refrigerant flows through the refrigerant pipe 43, and then flows into the outdoor heat exchanger 23. Thereafter, inside the outdoor heat exchanger 23, the refrigerant is subjected to heat exchange with outdoor air taken into the outdoor unit 2 by rotation of the outdoor fan 27, so that the refrigerant is condensed. The refrigerant flows out from the outdoor heat exchanger 23, and then flows through the outdoor-unit liquid pipe 44. Then, the refrigerant flows into the liquid pipe 8 via the outdoor expansion valve 24 and the closing valve 25 each of which is fully opened.

After flowing through the liquid pipe 8, the refrigerant flows into the indoor units 5a to 5c via the liquid-pipe connection parts 53a to 53c. The refrigerant that has flown into the indoor units 5a to 5c flows through the indoor-unit liquid pipes 71a to 71c, and is decompressed while flowing through the indoor expansion valves 52a to 52c. The refrigerant flown into the indoor heat exchangers 51a to 51c from the indoor-unit liquid pipes 71a to 71c is subjected to heat exchange with air taken into the indoor units 5a to 5c by rotation of the indoor fans 55a to 55c, so that the refrigerant is evaporated. As such, the indoor heat exchangers 51a to 51c each serve as an evaporator. Furthermore, the air that has been cooled as a result of the heat exchange with the refrigerant in the indoor heat exchangers 51a to 51c is blown into the respective rooms through outlets (not illustrated). In this manner, cooling of the rooms in which the indoor units 5a to 5c are installed is performed.

The refrigerant flows out from the indoor heat exchangers 51a to 51c, and then flows into the gas pipe 9 via the indoor-unit gas pipes 72a to 72c and the gas-pipe connection parts 54a to 54c. After flowing through the gas pipe 9, the refrigerant flows into the outdoor unit 2 via the closing valve 26. The refrigerant that has flown into the outdoor unit 2 flows through the outdoor-unit gas pipe 45, the four-way valve 22, the refrigerant pipe 46, the accumulator 28, and the intake pipe 42 in sequence. The refrigerant is then drawn into the compressor 21, and is compressed again.

<Heating Operation>

As shown in FIG. 1A, in the case where the indoor units 5a to 5c perform a heating operation, the CPU 210 of the outdoor-unit controller 200 operates the four-way valve 22 such that the ports a and d of the four-way valve 22 are communicated with each other and the ports b and c of the four-way valve 22 are communicated with each other, as indicated by the solid lines. Consequently, the refrigerant circuit 100 enters a heating cycle. Namely, the outdoor heat exchanger 23 serves as an evaporator, and the indoor heat exchangers 51a to 51c each serve as a condenser.

The high-pressure refrigerant discharged from the compressor 21 flows through the discharge pipe 41, and then flows into the four-way valve 22. From the four-way valve 22, the refrigerant further flows through the outdoor-unit gas pipe 45, the closing valve 26, the gas pipe 9, and the gas-pipe connection parts 54a to 54c in sequence, and then flows into the indoor units 5a to 5c. The refrigerant flown into the indoor units 5a to 5c flows through the indoor-unit gas pipes 72a to 72c, and then flows into the indoor heat exchangers 51a to 51c. Inside the indoor heat exchangers 51a to 51c, the refrigerant is subjected to heat exchange with air taken into the indoor units 5a to 5c by rotation of the indoor fans 55a to 55c, so that the refrigerant is condensed. As such, the indoor heat exchangers 51a to 51c each serve as a condenser. Furthermore, the air that has been heated as a result of the heat exchange with the refrigerant in the indoor heat exchangers 51a to 51c is blown into the respective rooms through the outlets (not illustrated). In this manner, heating of the rooms in which the indoor units 5a to 5c are installed is performed.

The refrigerant flows out from the indoor heat exchangers 51a to 51c, and then flows through the indoor-unit liquid pipes 71a to 71c. Then, the refrigerant flows through the indoor expansion valves 52a to 52c, so as to be decompressed. The refrigerant thus decompressed flows through the indoor-unit liquid pipes 71a to 71c and the liquid-pipe connection parts 53a to 53c, and then flows into the liquid pipe 8.

After flowing through the liquid pipe 8, the refrigerant flows into the outdoor unit 2 via the closing valve 25. The refrigerant that has flown into the outdoor unit 2 flows through the outdoor-unit liquid pipe 44, and is further decompressed while flowing through the outdoor expansion valve 24. The opening degree of the outdoor expansion valve 24 is set at a value corresponding to a discharge temperature of the compressor 21 detected by the discharge temperature sensor 33. The refrigerant that has flown from the outdoor-unit liquid pipe 44 into the outdoor heat exchanger 23 is subjected to heat exchange with ambient air taken into the outdoor unit 2 by rotation of the outdoor fan 27, so that the refrigerant is evaporated. The refrigerant flows out from the outdoor heat exchanger 23, and then flows through the refrigerant pipe 43, the four-way valve 22, the refrigerant pipe 46, the accumulator 28, and the intake pipe 42 in sequence. The refrigerant is then drawn into the compressor 21, and is compressed again.

<Operations, Functions and Effects Regarding Present Embodiment>

Next, with reference to FIGS. 1A, 1B, 2, and 3, the following describes operations, functions and effects of the refrigerant circuit in the air conditioner 1 of the present embodiment.

As shown in FIG. 2, according to the air conditioner 1 of the present embodiment, the indoor unit 5c is installed in the position further from the outdoor unit 2 than the indoor units 5a and 5b are, as described above. Namely, regarding the indoor unit 5c, a length of the portions of the liquid pipe 8 and the gas pipe 9 by which the indoor unit 5c and the outdoor unit 2 are connected to each other is longer than those of the indoor units 5a and 5b. In this case, when the air conditioner 1 performs a cooling operation or a heating operation, the following phenomenon might occur.

As described above, during a cooling operation, the refrigerant discharged from the compressor 21 flows through the discharge pipe 41, and flows into the outdoor heat exchanger 23 therefrom via the four-way valve 22, so that the refrigerant is condensed. Furthermore, the refrigerant flows out from the outdoor unit 2, and flows into the indoor heat exchangers 51a to 51c of the indoor units 5a to 5c, so that the refrigerant is evaporated. Meanwhile, during a heating operation, a gas refrigerant discharged from the compressor 21 flows through the discharge pipe 41, and flows into the outdoor-unit gas pipe 45 therefrom via the four-way valve 22, so as to flow out from the outdoor unit 2. Furthermore, the gas refrigerant flows into the indoor heat exchangers 51a to 51c of the indoor units 5a to 5c, so that the gas refrigerant is condensed. Then, the refrigerant flows out from the indoor units 5a to 5c, and flows into the outdoor heat exchanger 23 of the outdoor unit 2, so that the refrigerant is evaporated.

As described above, regarding the indoor unit 5c located further from the outdoor unit 2 than the indoor units 5a and 5b are, the length of the portions of the liquid pipe 8 and the gas pipe 9 by which the indoor unit 5c and the outdoor unit 2 are connected to each other is longer. Therefore, a pressure loss of the refrigerant caused by the liquid pipe 8 and the gas pipe 9 in the indoor unit 5c is greater than those in the indoor units 5a and 5b. Therefore, as compared to the indoor units 5a and 5b, the refrigerant is difficult to flow through the indoor unit 5c, whose portion of the refrigerant pipe, including the liquid pipe 8 and the gas pipe 9, for connecting the indoor unit 5c and the outdoor unit 2 is longer.

Thus, the refrigerant is difficult to flow through the indoor unit 5c, as compared to the indoor units 5a and 5b. Therefore, as compared to the other indoor units 5a and 5b, the indoor unit 5c has a longer rise time, which is a period taken until an indoor temperature reaches a set temperature since an air-conditioning operation is started. Consequently, a feeling of discomfort may be given to a user in the room in which the indoor unit 5c is installed.

In order to address this, in a case where the indoor units 5a to 5c have respective different rise times, each of which is a period taken until an indoor temperature reaches a set temperature since an air-conditioning operation is started, the air conditioner 1 of the present embodiment executes a refrigerant amount balance control for reducing the difference between the rise times. Specifically, in the case where the air conditioner 1 performs a cooling operation, refrigerant superheating degrees in the refrigerant exit openings (the gas-pipe connection parts 54a to 54c) of the indoor heat exchangers 51a to 51c of the indoor units 5a to 5c are calculated periodically (for example, every 30 seconds). A maximum value and a minimum value of the refrigerant superheating degrees thus calculated are extracted, and an average value of these values is calculated as an average refrigerant superheating degree. Meanwhile, in the case where the air conditioner 1 performs a heating operation, refrigerant subcooling degrees in the refrigerant exit openings (the liquid-pipe connection parts 53a to 53c) of the indoor heat exchangers 51a to 51c of the indoor units 5a to 5c are calculated periodically (for example, every 30 seconds). A maximum value and a minimum value of the refrigerant subcooling degrees thus calculated are extracted, and an average value of these values is calculated as an average refrigerant subcooling degree. Furthermore, opening degrees of the indoor expansion valves 52a to 52c of the indoor units 5a to 5c are adjusted so that the refrigerant superheating degrees or the refrigerant subcooling degrees in the refrigerant exit openings of the indoor heat exchangers 51a to 51c reach the average refrigerant superheating degree or average refrigerant subcooling degree thus calculated.

In the case where the indoor unit 5c is installed in the position further from the outdoor unit 2 than the indoor units 5a and 5b are as in the air conditioner 1 of the present embodiment, the refrigerant superheating degree of the indoor unit 5c, through which the refrigerant is difficult to flow, is larger than those of the indoor units 5a and 5b during a cooling operation. For example, the refrigerant superheating degree of the indoor unit 5a is three degrees, the refrigerant superheating degree of the indoor unit 5b is five degrees, and the refrigerant superheating degree of the indoor unit 5c is 11 degrees.

Assume that the refrigerant amount balance control is performed in a state as above. Consequently, opening of the indoor expansion valves 52a and 52b is restricted (i.e., opening degrees of these valves are reduced) in the indoor units 5a and 5b, which have smaller refrigerant superheating degrees than an average refrigerant superheating degree (in this example, seven degrees, which is an average value calculated from 11 degrees (maximum value) and three degrees (minimum value)), so that the refrigerant superheating degrees are increased to the average refrigerant superheating degree. Meanwhile, an opening degree of the indoor expansion valve 52c is increased in the indoor unit 5c, which has a larger refrigerant superheating degree than the average refrigerant superheating degree, so that the refrigerant superheating degree is reduced to the average refrigerant superheating degree. Note that initial opening degrees of the indoor expansion valves 52a to 52c at the time of start of the cooling operation will be described later.

Meanwhile, during a heating operation, the indoor unit 5c, through which the refrigerant is difficult to flow, has a larger refrigerant subcooling degree than those of the indoor units 5a and 5b. For example, the refrigerant subcooling degree of the indoor unit 5a is six degrees, the refrigerant subcooling degree of the indoor unit 5b is 10 degrees, and the refrigerant subcooling degree of the indoor unit 5c is 20 degrees.

Assume that the refrigerant amount balance control is performed in a state as above. Then, opening of the indoor expansion valves 52a and 52b is restricted (i.e., opening degrees of these valves are reduced) in the indoor units 5a and 5b, which have smaller refrigerant subcooling degrees than an average refrigerant subcooling degree (in this example, 13 degrees, which is an average value calculated from 20 degrees (maximum value) and six degrees (minimum value)), so that the refrigerant subcooling degrees are increased to the average refrigerant subcooling degree. Meanwhile, an opening degree of the indoor expansion valve 52c is increased in the indoor unit 5c, which has a larger refrigerant subcooling degree than the average refrigerant subcooling degree, so that the refrigerant subcooling degree is reduced to the average refrigerant subcooling degree. Note that initial opening degrees of the indoor expansion valves 52a to 52c at the time of start of the heating operation will be described later.

As described above, during a cooling operation or a heating operation, the air conditioner 1 of the present embodiment executes the refrigerant amount balance control. Consequently, opening of the indoor expansion valves 52a and 52b is restricted (i.e., the opening degrees of these valves are reduced) in the indoor units 5a and 5b, namely, an amount of refrigerant flowing through the indoor units 5a and 5b is reduced. Meanwhile, the opening degree of the indoor expansion valve 52c is increased in the indoor unit 5c, through which the refrigerant is difficult to flow. Consequently, a part of the refrigerant flown to the indoor units 5a and 5b is flown to the indoor unit 5c. This increases an amount of refrigerant flowing through the indoor unit 5c. This shortens a rise time of the indoor unit 5c, the rise time being a period taken until an indoor temperature reaches a set temperature since an air-conditioning operation is started.

<Flow of Processes of Air-Conditioning Operation by Outdoor-Unit Controller>

Figure 3:
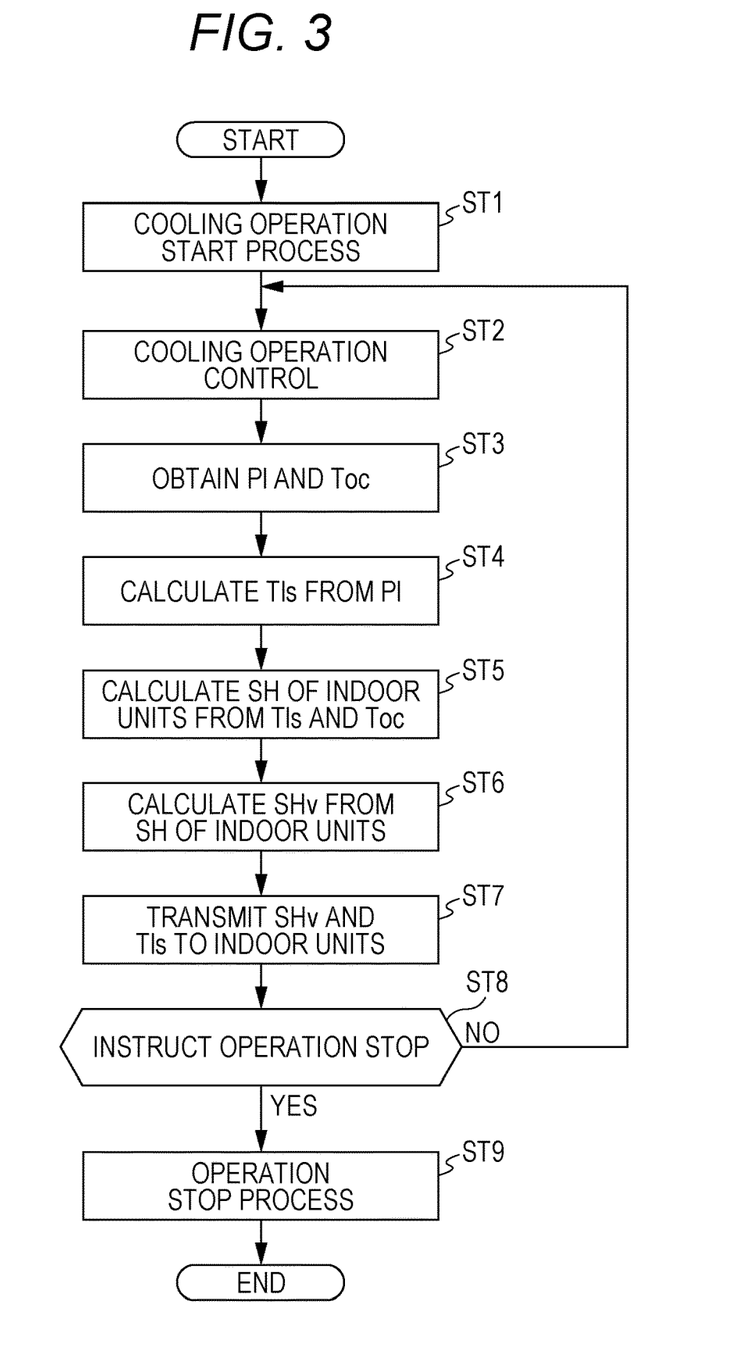
FIG. 3 is a flowchart illustrating processes of a cooling operation performed by the outdoor-unit controller according to the embodiment of the present disclosure.
Figure 4:
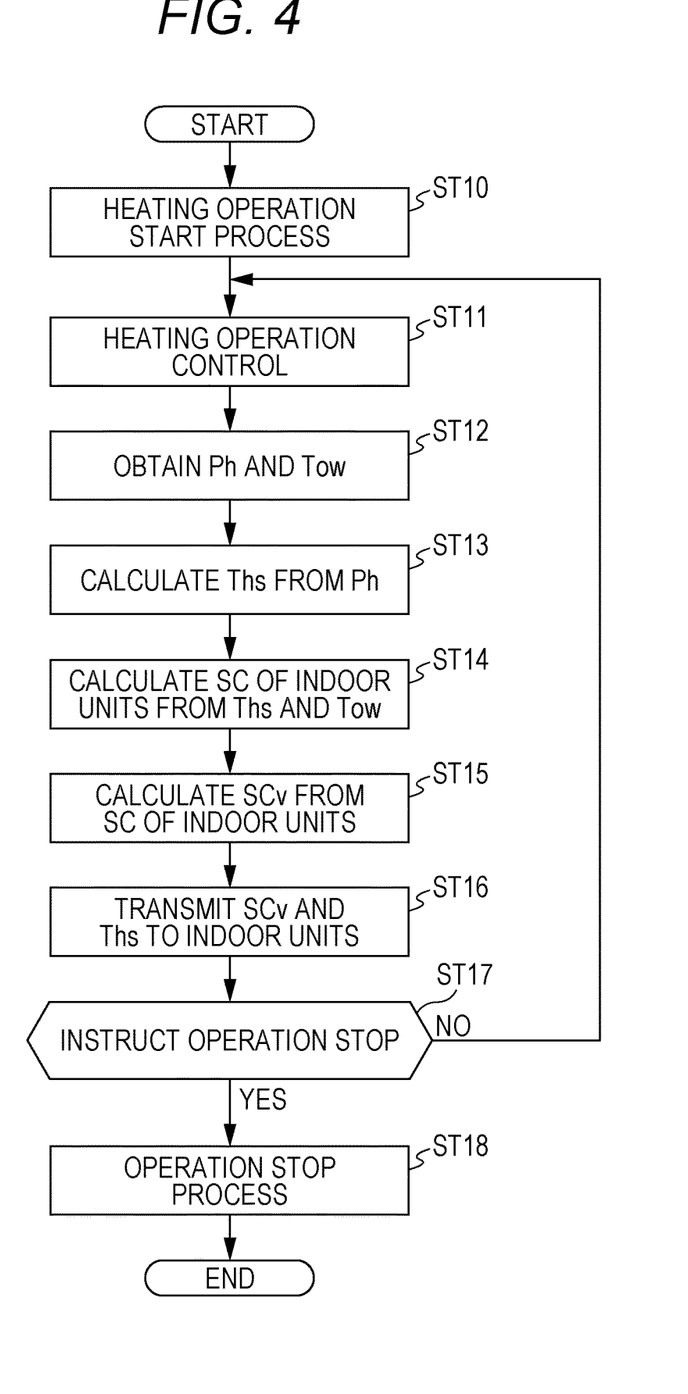
FIG. 4 is a flowchart illustrating processes of a heating operation performed by the outdoor-unit controller according to the embodiment of the present disclosure.

Next, with reference to FIGS. 3 and 4, the following describes how the air conditioner 1 of the present embodiment performs a control for a cooling operation and a control for a heating operation. FIG. 3 shows a flow of processes related to a control performed by the CPU 210 of the outdoor-unit controller 200 in the case where the air conditioner 1 performs the cooling operation. FIG. 4 shows a flow of processes related to a control performed by the CPU 210 of the outdoor-unit controller 200 in the case where the air conditioner 1 performs the heating operation. In FIGS. 3 and 4, the letters "ST" indicates a step, and a number following the letters "ST" indicates a step number. Note that FIGS. 3 and 4 each show processes related to the refrigerant amount balance control. Descriptions about processes other than these, for example, descriptions about general processes related to the air conditioner 1 are omitted. Examples of the general processes encompass a control of the refrigerant circuit 100 for an operation condition such as a set temperature and/or an airflow rate according to an instruction given by a user. The description below deals with, as an example, a case where all of the indoor units 5a to 5c perform a cooling operation or a heating operation.

In the description below, the reference sign "Pl" denotes an intake pressure of the compressor 21 that is detected by the intake pressure sensor 32 of the outdoor unit 2 during a control for a cooling operation. The reference sign "Tls" denotes a low pressure saturation temperature that is calculated from an intake pressure Pl. The reference sign "Toc" denotes heat exchange outlet temperatures that are detected by the gas-side temperature sensors 62a to 62c of the indoor units 5a to 5c (when the description individually refers to the indoor units 5a to 5c, the heat exchange outlet temperatures thereof are respectively denoted as "Toca" to "Tocc"). The reference sign "SH" denotes refrigerant superheating degrees in the refrigerant exit openings of the indoor heat exchangers 51a to 51c, each of the refrigerant superheating degrees being obtained by subtracting the low pressure saturation temperature Tls from the heat exchange outlet temperature Toc (when the description individually refers to the indoor units 5a to 5c, the refrigerant superheating degrees thereof are respectively denoted as "SHa" to "SHc"). The reference sign "SHv" denotes an average refrigerant superheating degree that is calculated from a maximum value and a minimum value of the refrigerant superheating degrees SH of the indoor units 5a to 5c.

Furthermore, the reference sign "Ph" denotes a discharge pressure of the compressor 21 that is detected by the discharge pressure sensor 31 of the outdoor unit 2 during a control for a heating operation. The reference sign "Ths" denotes a high pressure saturation temperature calculated from the discharge pressure Ph. The reference sign "Tow" denotes heat exchange outlet temperatures detected by the liquid-side temperature sensors 61a to 61c of the indoor units 5a to 5c (when the description individually refers to the indoor units 5a to 5c, the heat exchange outlet temperatures thereof are respectively denoted as "Towa" to "Towc"). The reference sign "SC" denotes refrigerant subcooling degrees in the refrigerant exit openings of the indoor heat exchangers 51a to 51c, each of the refrigerant subcooling degrees being obtained by subtracting the heat exchange outlet temperature Tow from the high pressure saturation temperature Ths (when the description individually refers to the indoor units 5a to 5c, the refrigerant subcooling degrees thereof are respectively denoted as "SCa" to "SCc"). The reference sign "SCv" denotes an average refrigerant subcooling degree that is calculated from a maximum value and a minimum value of the refrigerant subcooling degrees SC of the indoor units 5a to 5c.

<Control for Cooling Operation>

First, with reference to FIG. 3, the following describes a control for a cooling operation. First, the CPU 210 executes a cooling operation start process (ST1). Here, the cooling operation start process refers to a process in which the CPU 210 operates the four-way valve 22 for causing the refrigerant circuit 100 to enter a cooling cycle. The cooling operation start process is performed when the cooling operation is performed at first.

Next, the CPU 210 performs a control for the cooling operation (ST2). In the control for the cooling operation, the CPU 210 starts the compressor 21 and the outdoor fan 27 at the number of rotations according to a required capacity from the indoor units 5a to 5c. Furthermore, the CPU 210 obtains, via the sensor input section 240, a discharge temperature of the compressor 21 detected by the discharge temperature sensor 33. According to the discharge temperature thus obtained, the CPU 210 adjusts an opening degree of the outdoor expansion valve 24. Moreover, the CPU 210 transmits, to the indoor units 5a to 5c via the communication section 230, an operation start signal for starting the cooling operation.

The CPUs 510a to 510c of the indoor-unit controllers 500a to 500c of the indoor units 5a to 5c receive the operation start signal via the communication sections 530a to 530c. The CPUs 510a to 510c each start a respective one of the indoor fans 55a to 55c at the number of rotations according to an instruction as to an airflow rate given by a user. Furthermore, the CPUs 510a to 510c adjust opening degrees of the indoor expansion valves 52a to 52c so that refrigerant superheating degrees SH in the refrigerant exit openings (the gas-pipe connection parts 54a to 54c) of the indoor heat exchangers 51a to 51c reach a target refrigerant superheating degree for operation start (for example, three degrees). Here, the target refrigerant superheating degree for operation start is calculated by, e.g., a test performed preliminarily, and is stored in the storage sections 520a to 520c. The target refrigerant superheating degree for operation start is a value that is verified to allow each of the indoor units to exert an adequate cooling capacity. During a period taken until the state of the refrigerant circuit 100 becomes stable since the cooling operation is started (for example, for three minutes after start of the operation), the CPUs 510a to 510c adjust the opening degrees of the indoor expansion valves 52a to 52c so that the refrigerant superheating degrees SH reach the above-described target refrigerant superheating degree for operation start.

Next, the CPU 210 obtains, via the sensor input section 240, an intake pressure Pl detected by the intake pressure sensor 32 (ST3). Furthermore, the CPU 210 obtains heat exchange outlet temperatures Toc (Toca to Tocc) from the indoor units 5a to 5c via the communication section 230 (ST3). Note that the CPUs 510a to 510c obtain detection values detected by the gas-side temperature sensors 62a to 62c of the indoor units 5a to 5c, and transmit the detection values to the outdoor unit 2 via the communication sections 530a to 530c as the heat exchange outlet temperatures Toc. The detection values are obtained by the CPUs at every predetermined period (for example, every 30 seconds), and are stored in the storage sections.

Next, the CPU 210 calculates a low pressure saturation temperature Tls from the intake pressure Pl obtained in ST3 (ST4). The CPU 210 calculates refrigerant superheating degrees SH of the indoor units 5a to 5c from the low pressure saturation temperature Tls thus calculated and the heat exchange outlet temperatures Toc obtained in ST3 (ST5).

Next, the CPU 210 calculates an average refrigerant superheating degree SHv from the refrigerant superheating degrees SH of the indoor units 5a to 5c calculated in ST5 (ST6). Specifically, the CPU 210 extracts a maximum value and a minimum value of the refrigerant superheating degrees SHa to SHc of the indoor units 5a to 5c, and calculates an average value of these values. The CPU 210 deals with the calculation result as the average refrigerant superheating degree SHv.

Next, the CPU 210 transmits, to the indoor units 5a to 5c via the communication section 230, the average refrigerant superheating degree SHv calculated in ST6 and the low pressure saturation temperature Tls calculated in ST4 (ST7). The CPUs 510a to 510c of the indoor units 5a to 5c receive the average refrigerant superheating degree SHv and the low pressure saturation temperature Tls via the communication sections 530a to 530c. The CPUs 510a to 510c each subtract, from a respective one of the heat exchange outlet temperatures Toca to Tocc detected by the gas-side temperature sensors 62a to 62c, the low pressure saturation temperature Tls that has been received from the outdoor unit 2. In this manner, the CPUs 510a to 510c calculate the refrigerant superheating degrees SHa to SHc. The CPUs 510a to 510c adjust the opening degrees of the indoor expansion valves 52a to 52c so that the refrigerant superheating degrees SHa to SHc thus calculated reach the average refrigerant superheating degree SHv received from the outdoor unit 2.

The above-described processes from ST3 to ST7 are the processes related to the refrigerant amount balance control performed during the cooling operation according to the present embodiment.

After finishing the process in ST7, the CPU 210 determines the presence or absence of an operation stop instruction given by the user (ST8). The operation stop instruction instructs all the indoor units 5a to 5c to stop the operation. If the presence of the operation stop instruction is determined (ST8—Yes), the CPU 210 executes an operation stop process (ST9), so that the process is ended. In the operation stop process, the CPU 210 stops the compressor 21 and the outdoor fan 27, and causes the outdoor expansion valve 24 to be fully closed. Furthermore, the CPU 210 transmits, to the indoor units 5a to 5c via the communication section 230, an operation stop signal for stopping the operation. The CPUs 510a to 510c of the indoor units 5a to 5c receive the operation stop signal via the communication sections 530a to 530c. The CPUs 510a to 510c stop the indoor fans 55a to 55c, and cause the indoor expansion valves 52a to 52c to be fully closed.

If the absence of the operation stop instruction is determined in ST8 (ST8—No), the CPU 210 returns to the process in ST2.

<Control for Heating Operation>

Next, with reference to FIG. 4, the following describes a control for a heating operation. Note that the processes in ST17 and ST18 in FIG. 4 are identical to the processes in ST8 and ST9 of the control for the cooling operation shown in FIG. 3, and therefore descriptions about the processes in ST17 and ST18 are omitted. First, the CPU 210 executes a heating operation start process (ST10). Here, the heating operation start process refers to a process in which the CPU 210 operates the four-way valve 22 for causing the refrigerant circuit 100 to enter a heating cycle. The heating operation start process is performed when the heating operation is performed at first.

Next, the CPU 210 performs a control for the heating operation (ST11). In the control for the heating operation, the CPU 210 starts the compressor 21 and the outdoor fan 27 at the number of rotations according to a required capacity from the indoor units 5a to 5c. Furthermore, the CPU 210 obtains, via the sensor input section 240, a discharge temperature of the compressor 21 detected by the discharge temperature sensor 33. According to the discharge temperature thus obtained, the CPU 210 adjusts an opening degree of the outdoor expansion valve 24. Moreover, the CPU 210 transmits, to the indoor units 5a to 5c via the communication section 230, an operation start signal for starting the heating operation.

The CPUs 510a to 510c of the indoor-unit controllers 500a 500c of the indoor units 5a to 5c receive the operation start signal via the communication sections 530a to 530c. The CPUs 510a to 510c each start a respective one of the indoor fans 55a to 55c at the number of rotations according to an instruction as to an airflow rate given by a user. Furthermore, the CPUs 510a to 510c adjust opening degrees of the indoor expansion valves 52a to 52c so that refrigerant subcooling degrees SC in the refrigerant exit openings (the liquid-pipe connection parts 53a to 53c) of the indoor heat exchangers 51a to 51c reach a target refrigerant subcooling degree for operation start (for example, six degrees). Here, the target refrigerant subcooling degree for operation start is calculated by, e.g., a test performed preliminarily, and is stored in the storage sections 520a to 520c. The target refrigerant superheating degree for operation start is a value that is verified to allow each of the indoor units to exert an adequate heating capacity. During a period taken until the state of the refrigerant circuit 100 becomes stable since the heating operation is started (for example, for three minutes after start of the operation), the CPUs 510a to 510c adjust the opening degrees of the indoor expansion valves 52a to 52c so that the refrigerant subcooling degrees SC reach the above-described target refrigerant subcooling degree for operation start.

Next, the CPU 210 obtains, via the sensor input section 240, a discharge pressure Ph detected by the discharge pressure sensor 31 (ST12). Furthermore, the CPU 210 obtains heat exchange outlet temperatures Tow (Towa to Towc) from the indoor units 5a to 5c via the communication section 230 (ST12). Note that the CPUs 510a to 510c obtain, as the heat exchange outlet temperatures Tow, detection values detected by the liquid-side temperature sensors 61a to 61c in the indoor units 5a to 5c, and transmit the detection values to the outdoor unit 2 via the communication sections 530a to 530c. The above-described detection values are obtained by the CPUs at every predetermined period (for example, every 30 seconds), and are stored in the storage sections.

Next, the CPU 210 calculates a high pressure saturation temperature Ths from the discharge pressure Ph obtained in ST12 (ST13). The CPU 210 calculates refrigerant subcooling degrees SC of the indoor units 5a to 5c from the high pressure saturation temperature Ths thus calculated and the heat exchange outlet temperatures Tow obtained in ST12 (ST14).

Next, the CPU 210 calculates an average refrigerant subcooling degree SCv from the refrigerant subcooling degrees SC of the indoor units 5a to 5c calculated in ST14 (ST15). Specifically, the CPU 210 extracts a maximum value and a minimum value of the refrigerant subcooling degrees SCa to SCc of the indoor units 5a to 5c, and calculates an average value of these values. The CPU 210 deals with the calculation result as the average refrigerant subcooling degree SCv.

Next, the CPU 210 transmits, to the indoor units 5a to 5c via the communication section 230, the average refrigerant subcooling degree SCv calculated in ST15 and the high pressure saturation temperature Ths calculated in ST13 (ST16). The CPUs 510a to 510c of the indoor units 5a to 5c receive the average refrigerant subcooling degree SCv and the high pressure saturation temperature Ths via the communication sections 530a to 530c. The CPUs 510a to 510c each subtract, from the high pressure saturation temperature Ths received from the outdoor unit 2, a respective one of the heat exchange outlet temperatures Towa to Towc detected by the liquid-side temperature sensors 61a to 61c. In this manner, the CPUs 510a to 510c calculate the refrigerant subcooling degrees SCa to SCc. The CPUs 510a to 510c adjust the opening degrees of the indoor expansion valves 52a to 52c so that the refrigerant subcooling degrees SCa to SCc thus calculated reach the average refrigerant subcooling degree SCv received from the outdoor unit 2.

The above-described processes from ST12 to ST16 are the processes related to the refrigerant amount balance control performed during the heating operation according to the present embodiment.

As described above, in the case where the air conditioner 1 of the present disclosure performs the cooling operation, the air conditioner 1 executes the refrigerant amount balance control for adjusting the opening degrees of the indoor expansion valves 52a to 52c so that the refrigerant superheating degrees SHa to SHc of the indoor units 5a to 5c reach the average refrigerant superheating degree SHv that is calculated from the maximum value and the minimum value of the refrigerant superheating degrees SHa to SHc. Meanwhile, in the case where the air conditioner 1 performs the heating operation, the air conditioner 1 executes the refrigerant amount balance control for adjusting the opening degrees of the indoor expansion valves 52a to 52c so that the refrigerant subcooling degrees SCa to SCc of the indoor units 5a to 5c reach the average refrigerant subcooling degree SCv that is calculated from the maximum value and the minimum value of the refrigerant subcooling degrees SCa to SCc. Consequently, in a case where there exists an indoor unit through which a refrigerant is difficult to flow, it is possible to shorten a rise time of the indoor unit, the rise time being a period taken until an indoor temperature reaches a set temperature since an air-conditioning operation is started. This reduces the difference between the rise times of the indoor units.

Note that, in the example in the present embodiment described above, installation conditions of the indoor units 5a to 5c are defined such that the lengths of the portions of the refrigerant pipe, including the liquid pipe 8 and the gas pipe 9, of the indoor units 5a to 5c are different from each other. Namely, in the above example, the lengths of the portions of the refrigerant pipe are different from each other, and therefore there exists an indoor unit through which a refrigerant is difficult to flow. However, the present disclosure is not limited to this. Alternatively, in the present embodiment, the refrigerant amount balance control may be executed also in a case where there exists, among the indoor units 5a to 5c, an indoor unit through which a refrigerant is difficult to flow due to a difference between the indoor heat exchangers of the indoor units 5a to 5c.

For example, there may be a case where, among indoor units 5a to 5c, an indoor unit 5c includes an indoor heat exchanger larger than those of the other indoor units 5a and 5b, and thus the indoor heat exchanger of the indoor unit 5c has a path longer than those of the other indoor units 5a and 5b. Alternatively, there may be a case where an indoor unit 5c includes an indoor heat exchanger having a different shape from those of the other indoor units 5a and 5b, and thus the indoor heat exchanger of the indoor unit 5c has a path whose number of turnings is larger than those of the other indoor units 5a and 5b. In such a case, a pressure loss caused by the path of the indoor heat exchanger of the indoor unit 5c is greater than those of the other indoor units 5a and 5b. Consequently, the refrigerant is difficult to flow through the indoor unit 5c, as compared to the other indoor units 5a and 5b. Therefore, the indoor unit 5c has a longer rise time taken until an indoor temperature reaches a set temperature since an air-conditioning operation is started, as compared to the other indoor units 5a and 5b. By executing the refrigerant amount balance control in such a case, opening of the indoor expansion valves 52a and 52b is restricted (i.e., opening degrees of these valves are reduced) in the indoor units 5a and 5b, namely, an amount of refrigerant flowing through the indoor units 5a and 5b is reduced. Meanwhile, an opening degree of the indoor expansion valve 52c is increased in the indoor unit 5c, through which the refrigerant is difficult to flow. Consequently, a part of the refrigerant flown to the indoor units 5a and 5b is flown to the indoor unit 5c, thereby increasing an amount of refrigerant flowing through the indoor unit 5c. This shortens a rise time of the indoor unit 5c, the rise time being a period taken until an indoor temperature reaches a set temperature since an air-conditioning operation is started. This reduces the difference between the rise times of the indoor units 5a to 5c.

In the present embodiment, the indoor units 5a to 5c include, in their insides, the indoor expansion valves 52a to 52c. However, it is only necessary for the indoor expansion valves 52a to 52c to be respectively provided to the indoor units 5a to 5c. For example, the indoor expansion valves 52a to 52c may be provided outside the indoor units 5a to 5c.

In the present embodiment, the CPU 210 and the CPUs 510a to 510c execute the refrigerant amount balance control when the indoor units 5a to 5c have respective different rise times, each of which is a period taken until an indoor temperature reaches a set temperature since an air-conditioning operation is started. Alternatively, however, the CPU 210 and the CPUs 510a to 510c may execute the refrigerant amount balance control at any timing.

In the present embodiment, the CPU 210 and the CPUs 510a to 510c calculate the average value of the refrigerant superheating degrees in the refrigerant exit openings of the indoor heat exchangers 51a to 51c or the average value of the refrigerant subcooling degrees in the refrigerant exit openings of the indoor heat exchangers 51a to 51c, and adjust the opening degrees of the indoor expansion valves 52a to 52c so that the refrigerant superheating degrees in the refrigerant exit openings of the indoor heat exchangers 51a to 51c reach the average value or the refrigerant subcooling degrees in the refrigerant exit openings of the indoor heat exchangers 51a to 51c reach the average value. However, the present disclosure is not limited to this. Alternatively, the CPU 210 and the CPUs 510a to 510c may adjust the opening degrees of the indoor expansion valves 52a to 52c so that the refrigerant superheating degrees in the refrigerant exit openings of the indoor heat exchangers 51a to 51c become equal to each other or the refrigerant subcooling degrees in the refrigerant exit openings of the indoor heat exchangers 51a to 51c become equal to each other.

In the present embodiment, the CPU 210 and the CPUs 510a to 510c adjust the opening degrees of the indoor expansion valves 52a to 52c based on the refrigerant superheating degrees in the refrigerant exit openings of the indoor heat exchangers 51a to 51c or the refrigerant subcooling degrees in the refrigerant exit openings of the indoor heat exchangers 51a to 51c. However, the present disclosure is not limited to this. Alternatively, the CPU 210 and the CPUs 510a to 510c may adjust the opening degrees of the indoor expansion valves 52a to 52c based on operation state amounts with which the indoor heat exchangers 51a to 51c of the indoor units 5a to 5c exert heat exchange amounts.

The operation state amounts encompass, for example, refrigerant superheating degrees in the refrigerant exit openings of the indoor heat exchangers 51a to 51c, refrigerant subcooling degrees in the refrigerant exit openings of the indoor heat exchangers 51a to 51c, refrigerant pressures in the refrigerant exit openings of the indoor heat exchangers 51a to 51c, refrigerant temperatures in the refrigerant exit openings of the indoor heat exchangers 51a to 51c, and differences between a saturation temperature (for example, a low pressure saturation temperature or a high pressure saturation temperature) and refrigerant temperatures in the refrigerant exit openings of the indoor heat exchangers 51*a* to 51*c* of the indoor units 5*a* to 5*c*.

Note that the above-described heat exchange amounts correspond to air-conditioning capacities of the indoor units 5*a* to 5*c*. The air-conditioning capacities are calculated, for example, based on a difference between an indoor temperature and an evaporation temperature (or a condensation temperature), airflow rates of the indoor fans 55*a* to 55*c*, and superheating degrees (or subcooling degrees).

In the present embodiment, the refrigerant amount balance control is performed by the CPU 210 and the CPUs 510*a* to 510*c* in collaboration. However, the present disclosure is not limited to this. Alternatively, the air conditioner 1 may perform the refrigerant amount balance control by a single controller. In such a case, the controller controls the members of the outdoor unit 2 and the indoor units 5*a* to 5*c*.

The present disclosure can be said to relate to an air conditioner in which at least one outdoor unit is connected to a plurality of indoor units via a refrigerant pipe.

An embodiment of the present disclosure may be a first or second air conditioner below.

The first air conditioner is an air conditioner including: an outdoor unit including a compressor, a four-way valve, an outdoor heat exchanger, and an outdoor expansion valve; a plurality of indoor units respectively including indoor heat exchangers and indoor expansion valves; and a controller for controlling opening degrees of the indoor expansion valves based on refrigerant superheating degrees in refrigerant exit openings of the indoor heat exchangers during a cooling operation or refrigerant subcooling degrees in refrigerant exit openings of the indoor heat exchangers during a heating operation, wherein in a case where the indoor units have respective different rise times, each of which is a period taken until an indoor temperature reaches a set temperature since an air-conditioning operation is started, the controller executes a refrigerant amount balance control, the refrigerant amount balance control during a cooling operation calculating an average value of the refrigerant superheating degrees from a maximum value and a minimum value of the refrigerant superheating degrees in the refrigerant exit openings of the indoor heat exchangers and adjusting the opening degrees of the indoor expansion valves so that the refrigerant superheating degrees of the indoor units reach the average value, the refrigerant amount balance control during a heating operation calculating an average value of the refrigerant subcooling degrees from a maximum value and a minimum value of the refrigerant subcooling degrees in the refrigerant exit openings of the indoor heat exchangers and adjusting the opening degrees of the indoor expansion valves so that the refrigerant subcooling degrees of the indoor units reach the average value.

The second air conditioner includes: an outdoor unit including a compressor; a plurality of indoor units respectively including indoor heat exchangers; expansion valves respectively provided to the indoor units, the expansion valves adjusting flow rates of a refrigerant in the indoor heat exchangers; and a controller for executing a refrigerant amount balance control for adjusting opening degrees of the expansion valves so that differences between a saturation temperature (for example, a low pressure saturation temperature or a high pressure saturation temperature) and refrigerant temperatures in refrigerant exit openings of the indoor heat exchangers of the indoor units become equal to each other.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An air conditioner comprising:
an outdoor unit;
a plurality of indoor units respectively including indoor heat exchangers;
expansion valves respectively provided to the plurality of indoor units, the expansion valves being configured to adjust flow rates of a refrigerant in the indoor heat exchangers; and
a controller for executing a refrigerant amount balance control for adjusting opening degrees of the expansion valves so that operation state amounts, with which the indoor heat exchangers exert heat exchange amounts, of the plurality of indoor units become equal to each other,
wherein each of the plurality of indoor units further includes a gas-side temperature sensor which detects a temperature of the refrigerant flown from the respective indoor heat exchangers during a cooling operation,
wherein, during the cooling operation, the controller calculates respective refrigerant superheating degrees in respective refrigerant exit openings of the respective indoor heat exchangers based on the respective temperatures detected by the respective gas-side temperature sensors, calculates an average refrigerant superheating degree which is an average value of a maximum value and a minimum value among the calculated refrigerant superheating degrees, and controls the opening degrees of the expansion valves so that the respective refrigerant superheating degrees reach the average refrigerant superheating degree,
wherein each of the plurality of indoor units respectively further include a liquid-side temperature sensor which detects a temperature of the refrigerant flown from the respective indoor heat exchangers during a heating operation, and
wherein, during the heating operation, the controller calculates respective refrigerant subcooling degrees in respective refrigerant exit openings of the respective indoor heat exchangers based on the respective temperatures detected by the respective liquid-side temperature sensors, calculates an average refrigerant subcooling degree which is an average value of a maximum value and a minimum value among the calculated refrigerant subcooling degrees, and controls the opening degrees of the expansion valves so that the respective refrigerant subcooling degrees reach the average refrigerant subcooling degree.

2. The air conditioner according to claim 1,
wherein the expansion valves are disposed inside the indoor units.

3. The air conditioner according to claim 1, wherein the respective refrigerant superheating degrees are different from each other, and the respective refrigerant subcooling degrees are different from each other.

4. The air conditioner according to claim 1,
wherein, during the cooling operation, the controller calculates respective refrigerant superheating degrees in respective refrigerant exit openings of the respective indoor heat exchangers based on the respective temperatures simultaneously detected by the respective gas-side temperature sensors, and wherein, during the heating operation, the controller calculates respective refrigerant subcooling degrees in respective refrigerant exit openings of the respective indoor heat exchangers based on the respective temperatures simultaneously detected by the respective liquid-side temperature sensors.

5. An air conditioner comprising:

an outdoor unit;

a plurality of indoor units respectively including indoor heat exchangers;

expansion valves respectively provided to the plurality of indoor units, the expansion valves being configured to adjust flow rates of a refrigerant in the indoor heat exchangers; and a controller for executing a refrigerant amount balance control for adjusting opening degrees of the expansion valves so that operation state amounts, with which the indoor heat exchangers exert heat exchange amounts, of the plurality of indoor units become equal to each other, wherein each of the plurality of indoor units further includes a gas-side temperature sensor which detects a temperature of the refrigerant flown from the respective indoor heat exchangers during a cooling operation, and wherein, during the cooling operation, the controller calculates respective refrigerant superheating degrees in respective refrigerant exit openings of the respective indoor heat exchangers based on the respective temperatures detected by the respective gas-side temperature sensors, calculates an average refrigerant superheating degree which is an average value of a maximum value and a minimum value among the calculated refrigerant superheating degrees, and controls the opening degrees of the expansion valves so that the respective refrigerant superheating degrees reach the average refrigerant superheating degree.

6. The air conditioner according to claim 5, wherein the respective refrigerant superheating degrees are different from each other.

7. The air conditioner according to claim 5, wherein, during the cooling operation, the controller calculates respective refrigerant superheating degrees in respective refrigerant exit openings of the respective indoor heat exchangers based on the respective temperatures simultaneously detected by the respective gas-side temperature sensors.

8. An air conditioner comprising:

an outdoor unit;

a plurality of indoor units respectively including indoor heat exchangers;

expansion valves respectively provided to the plurality of indoor units, the expansion valves being configured to adjust flow rates of a refrigerant in the indoor heat exchangers; and a controller for executing a refrigerant amount balance control for adjusting opening degrees of the expansion valves so that operation state amounts, with which the indoor heat exchangers exert heat exchange amounts, of the plurality of indoor units become equal to each other, wherein each of the plurality of indoor units respectively further include a liquid-side temperature sensor which detects a temperature of the refrigerant flown from the respective indoor heat exchangers during a heating operation, and wherein, during the heating operation, the controller calculates respective refrigerant subcooling degrees in respective refrigerant exit openings of the respective indoor heat exchangers based on the respective temperatures detected by the respective liquid-side temperature sensors, calculates an average refrigerant subcooling degree which is an average value of a maximum value and a minimum value among the calculated refrigerant subcooling degrees, and controls the opening degrees of the expansion valves so that the respective refrigerant subcooling degrees reach the average refrigerant subcooling degree.

9. The air conditioner according to claim 8, wherein the respective refrigerant subcooling degrees are different from each other.

10. The air conditioner according to claim 8, wherein, during the heating operation, the controller calculates respective refrigerant subcooling degrees in respective refrigerant exit openings of the respective indoor heat exchangers based on the respective temperatures simultaneously detected by the respective liquid-side temperature sensors.

* * * * *